No. 649,515. Patented May 15, 1900.
W. GRÖZINGER.
SWIVEL HOOK.
(Application filed Jan. 3, 1900.)

(No Model.)

(Section A-A.)

WITNESSES:
Ella L. Giles

INVENTOR
Wilhelm Grözinger
ATTORNEYS

THE NORRIS PETERS CO., PHOTO-LITHO., WASHINGTON, D. C.

UNITED STATES PATENT OFFICE.

WILHELM GRÖZINGER, OF GMUEND, GERMANY.

SWIVEL-HOOK.

SPECIFICATION forming part of Letters Patent No. 649,515, dated May 15, 1900.

Application filed January 3, 1900. Serial No. 248. (No model.)

*To all whom it may concern:*

Be it known that I, WILHELM GRÖZINGER, a subject of the King of Würtemberg, residing at Gmuend, Würtemberg, Germany, have invented a Hook with Bayonet-Catch for Watch-Chains, of which the following is a full, clear, and exact description.

My invention relates to swivel-hooks such as are used on watch-chains and in like situations.

The object of the invention is to provide a hook simple in structure which may be closed securely and which will not become free or break under strain.

To this end the invention includes a shank and hook, with a hood mounted on the shank having a portion adapted to interlock with the end of the hook.

The invention is illustrated in the accompanying drawings, in which—

Figure 1:
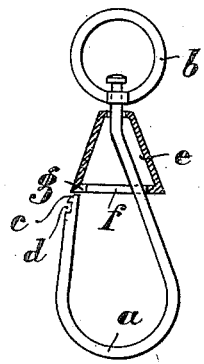
Figure 2:
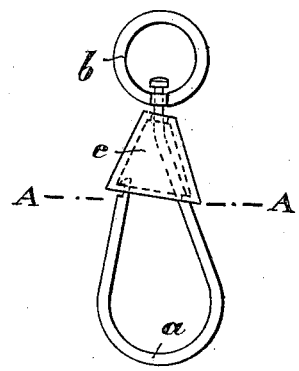
Figure 3:
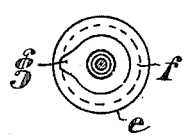
Figure 4:
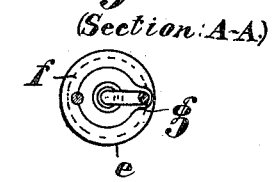
Figure 5:
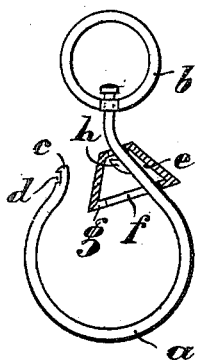
Figure 6:
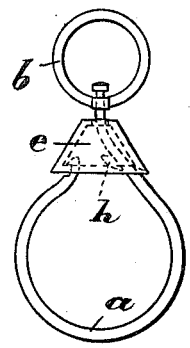

Figure 1 is a central vertical sectional view of the device; Fig. 2, a side elevation of the same; Fig. 3, a bottom plan view of the hood with the shank in section. Fig. 4 shows a bottom plan view of the hook with the shank in section on line A A of Fig. 2. Figs. 5 and 6 are sectional and elevational views, respectively, of a modification.

The shank of the hook has a swiveled connection to the ring $b$, adapted to be attached to the chain or the like. The shank terminates in a hook $a$, the end of which is provided with a transverse recess $d$ and a beveled end $c$. Upon the shank a conical hood $e$ is loosely mounted, which is provided at its lower edge with an inwardly-extending annular flange $f$, which is recessed at $g$. The wall of the hood forming the rear wall of this recess is beveled to correspond to the bevel $c$. In operation the hood is turned to bring the recess in alinement with the end of the hook, when this end is shoved into the hood through the recess until the recess $d$ is in alinement with the flange $f$, when the hood is turned to interlock the flange with this latter recess. The side walls of the recess $g$ are curved, so that as the hood is turned the shank opposite to the end of the hook will ride easily into this recess, so that the parts may be securely locked against accidental displacement, as shown in Fig. 4. The curved sides of the recess $g$ also allow of the shank riding out of the recess when an attempt to turn the hood is made so as to release the parts.

To prevent the hood slipping down on the shank and off the end of the hook when the hook and hood are disengaged, I provide, as shown in Figs. 5 and 6, a lateral projection or lug 5 on the shank, which projects beyond the shank a sufficient distance to engage the head of the hood.

I claim—

1. In combination, a hook having a shank, a hood mounted thereon having an annular flange and the end of said hook being recessed to engage said flange, substantially as described.

2. In combination, a hook having a shank, a hood revolubly mounted thereon having an annular flange with a recess therein, the side walls of said recess being rounded, the end of said hook being adapted to pass through the recess and engage said flange, substantially as described.

3. In combination, a hook having a shank, a hood loosely mounted thereon adapted to interlock with the end of the hook and a lateral projection on the shank below the hood forming a stop for the same.

In witness whereof I have hereunto set my hand in presence of two witnesses.

WILHELM GRÖZINGER.

Witnesses:
KARL BOSCH,
WM. HAHN.